(12) United States Patent
Gren

(10) Patent No.: US 9,800,735 B1
(45) Date of Patent: Oct. 24, 2017

(54) REMOTE CONTROL OF A MOBILE DEVICE

(71) Applicant: Microsoft Technology Licensing, LLC, Redmond, WA (US)

(72) Inventor: Juuso Gren, Kyröskoski (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/242,473

(22) Filed: Aug. 19, 2016

(51) Int. Cl.
*H04M 11/00* (2006.01)
*H04M 7/12* (2006.01)
*H04W 88/04* (2009.01)

(52) U.S. Cl.
CPC ....... *H04M 11/007* (2013.01); *H04M 7/1295* (2013.01); *H04W 88/04* (2013.01)

(58) Field of Classification Search
CPC .......................... H04M 11/007; H04M 7/1295
USPC ........................................................ 455/420
See application file for complete search history.

(56) References Cited

U.S. PATENT DOCUMENTS

| | | |
|---|---|---|
| 6,917,677 B2 | 7/2005 | Da Palma et al. |
| 7,606,585 B2 | 10/2009 | Suan |
| 8,660,530 B2 | 2/2014 | Sharp et al. |
| 8,811,970 B2 | 8/2014 | Danford et al. |
| 8,874,081 B2 | 10/2014 | Horn et al. |
| 2007/0190995 A1 | 8/2007 | Wang et al. |
| 2009/0227229 A1 | 9/2009 | Waller |
| 2010/0279673 A1* | 11/2010 | Sharp .................... H04L 67/125 455/419 |
| 2013/0160141 A1 | 6/2013 | Tseng et al. |

FOREIGN PATENT DOCUMENTS

WO    2013184907 A1    12/2013

OTHER PUBLICATIONS

"HotelmyPhone", Published on: Mar. 15, 2015, 9 pages, Available at: http://hotelmyphone.com/.
Andrus, et al., "Cells: A Virtual Mobile Smartphone Architecture", In Proceedings of the Twenty-Third ACM Symposium on Operating Systems Principles, Oct. 23, 2011, pp. 173-187.
"Custom Redirect Service", Published on: Sep. 1, 2015, 11 pages, Available at: https://www.verizon.com/tariffs/PDFViewer.aspx?doc=181166.
"Call Forwarding", Published on: Jan. 15, 2010, 1 page, Available at: http://www.three.com.hk/website/appmanager/three/home?_nfpb=true&pageLabel=P20047039121956771 0594&lang=eng&pageid=b15401.
"Phone Away", Published on: Feb. 18, 2015, 5 pages, Available at: http://phoneaway.in/features.html.
More, Leon, "How to control one android phone from another", Published on: Mar. 17, 2016, 3 pages, Available at: https://techolics.wordpress.com/2016/03/17/how-to-control-one-android-phone-from-another/.

* cited by examiner

*Primary Examiner* — Christopher M Brandt

(57) ABSTRACT

The user calls to the mobile device with a predetermined pattern. In one embodiment the predetermined pattern is coded on the duration of the unanswered calls and the duration between successive calls. The predetermined pattern may be time coded on the durations of successive calls. After detecting the predetermined pattern the mobile device answers the incoming call. The user may continue by identifying via the voice line, if that is required. The mobile device responds to commands provided via the voice line, for example by providing contact information as synthesized speech.

20 Claims, 3 Drawing Sheets

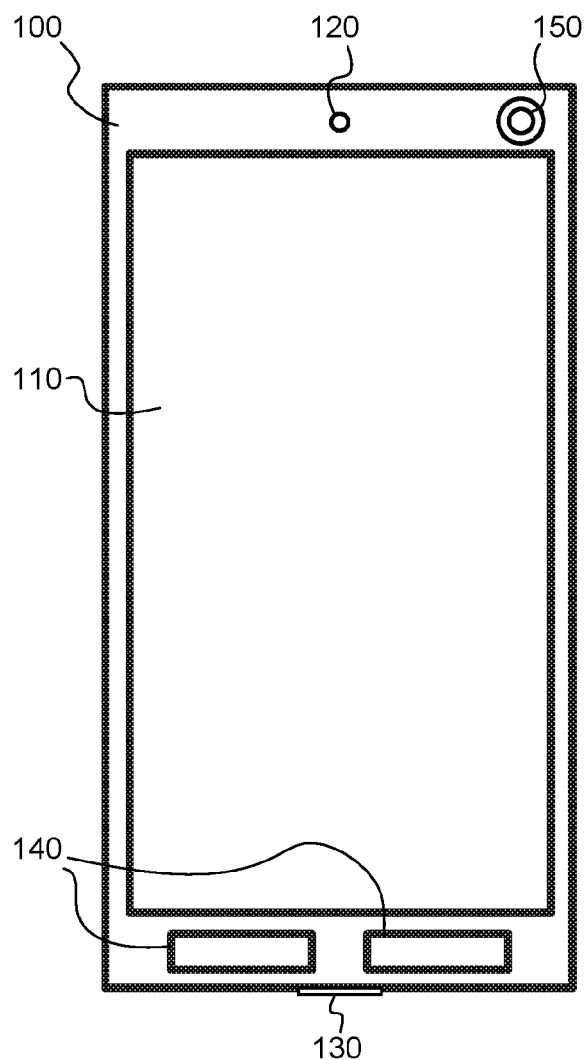
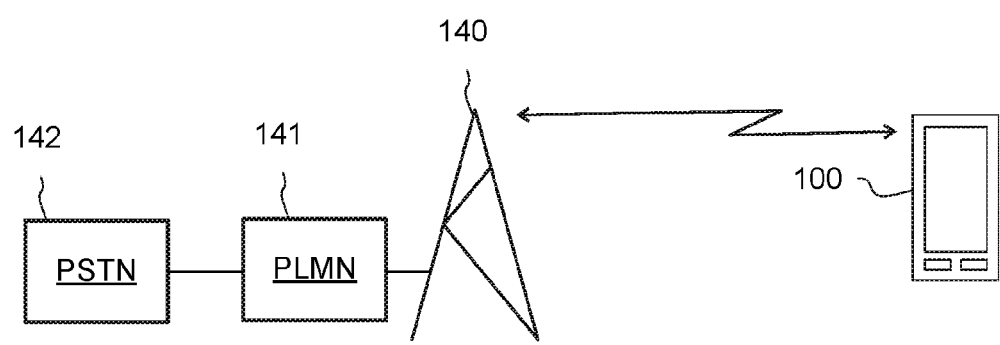
Fig. 1a
Fig. 1b

REMOTE CONTROL OF A MOBILE DEVICE

BACKGROUND

Mobile devices may contain information that may not be obtained elsewhere or at least obtaining the information would require entering various databases or information sources over the Internet. For example, phone numbers or contact details stored on the contact book of the mobile device may contain personalized information, such as details for a particular contact, groups or lists created within the contact book.

As one exemplary scenario, a user of the mobile device may have left the mobile device at a distant location, wherein direct contact with the mobile device is not possible. In some situations, the user may not reach any Internet connected location or reach a cloud computing environment that may contain the information from the mobile device. Borrowing a mobile device from a stranger may cause difficult situations: the cost of the connection may be an issue and the borrowed terminal may still retain some information from the session, leaving the mobile device vulnerable to identity theft.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

When a mobile device is in a distant location from the user, for example forgotten at home, the information residing in the mobile device is not available. The user may still have access to a traditional telephone connection providing a voice line, wherein the information on the mobile device may be accessed via the voice line.

The user calls to the mobile device with a predetermined pattern. The mobile device may not automatically answer all incoming calls, but only after recognizing the predetermined pattern. In one embodiment the predetermined pattern is coded on the duration of the unanswered calls and the duration between successive calls. The predetermined pattern may be time coded on the durations of successive calls. After detecting the predetermined pattern the mobile device answers the incoming call. The user may continue by identifying via the voice line, if that is required. The mobile device responds to commands provided via the voice line, for example by providing contact information as synthesized speech.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein:

FIG. 1a illustrates a mobile device according to an embodiment;

FIG. 1b illustrates one embodiment in which the mobile device is connected to a public land mobile network;

Like reference numerals are used to designate like parts in the accompanying drawings.

DETAILED DESCRIPTION

Figure 2:
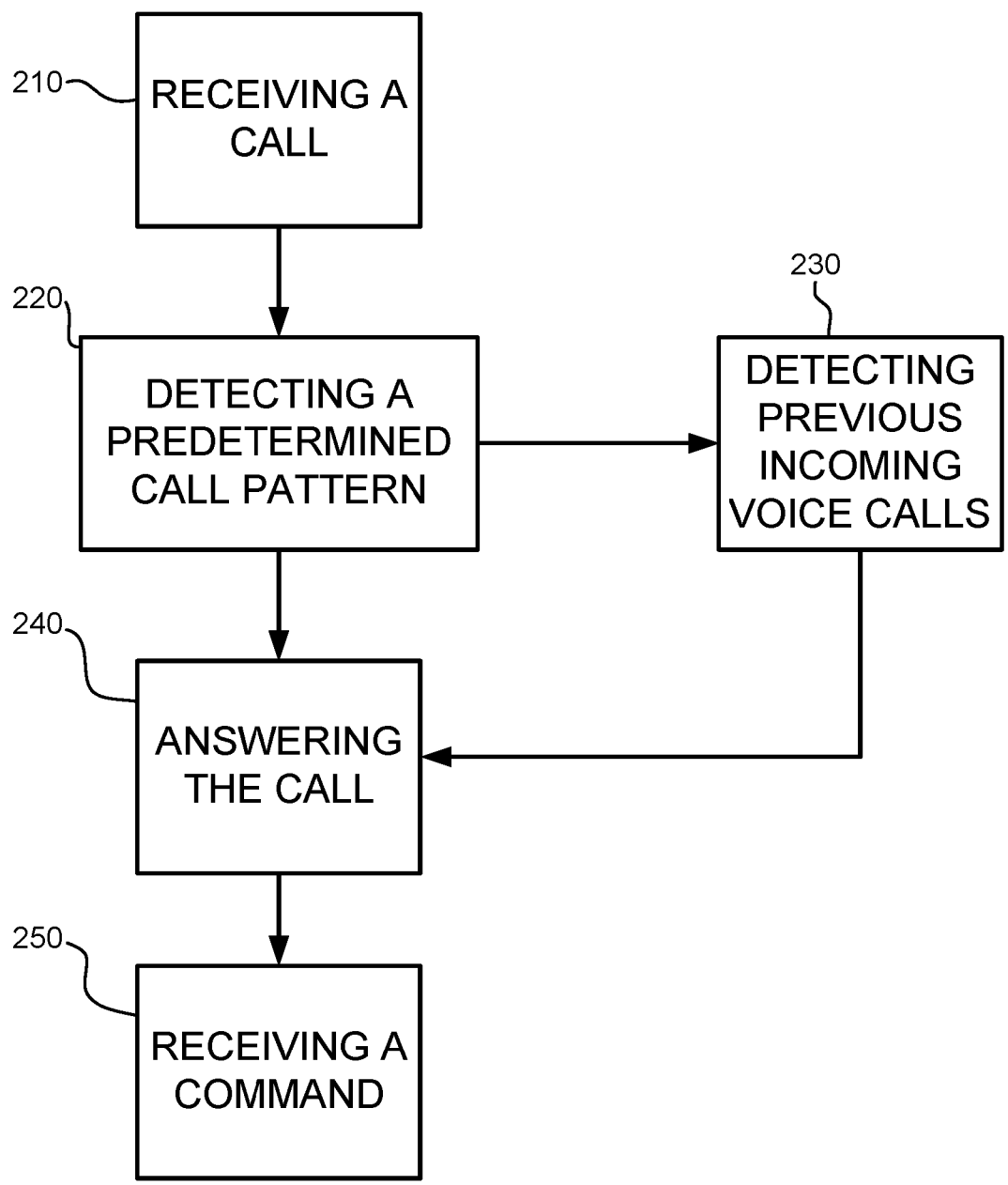
FIG. 2 illustrates schematically a flowchart of one embodiment.

The detailed description provided below in connection with the appended drawings is intended as a description of the present embodiments and is not intended to represent the only forms in which the present embodiments may be constructed or utilized. However, the same or equivalent functions and sequences may be accomplished by different embodiments.

Although the present examples are described and illustrated herein as being implemented in a smartphone, the device described is provided as an example and not a limitation. As those skilled in the art will appreciate, the present examples are suitable for application in a variety of different types of apparatuses that have the ability to receive a voice call and send or receive information over the voice line.

In a use case scenario according to one embodiment, a user of a mobile device is at a party, while having left the mobile device at home. The user needs to access a phone number that resides only on his/her mobile device's contact book—the number may be secret or stored under a nickname. The user could borrow someone else's mobile device to access his/her mobile device's contact book. The borrowed mobile device may not comprise a dedicated application for accessing a distant mobile device. Sometimes using mobile data or accessing an unknown website on the borrowed mobile device may cause socially awkward situations. Instead, the user calls to his/her own mobile number with a predetermined sequence. The user initiates multiple calls, each having predetermined length, but the receiving mobile device does not answer the incoming call until a predetermined call pattern has been completed. When the receiving mobile device detects the predetermined pattern, the voice line is opened and the user may provide further credentials via the voice line. The credential may be a spoken password or a DTMF code (DTMF, Dual Tone Multi Frequency). The user may provide voice commands to the mobile device and for example receive details from the contact book via the voice line. The user may also provide more elaborate voice commands, such as: "Send contact info of Alex as a message to this number", wherein the voice control application of the receiving mobile device completes the requested command.

FIG. 1a illustrates a mobile device according to an embodiment, wherein the mobile device is a smartphone. The mobile device comprises a body 100 comprising a display 110, a speaker 120, a microphone 130, keys 140 and a camera 150. The mobile device comprises at least one processor and at least one memory including computer program code for one or more programs. The at least one memory and the computer program code are configured, with the at least one processor, to cause the mobile device to perform at least the functionality described herein. The system described hereinafter may comprise a portion of the mobile device, its components and/or peripherals connected to the portable device.

FIG. 1b illustrates one embodiment in which the mobile device 100 is connected to a public land mobile network (PLMN) 141 via a base station 140. The PLMN network may be interconnected with a fixed system such as the public switched telephone network (PSTN) 142. From the mobile device's 100 perspective, the base station 140 offers the functionality required to connect to the wireless network.

FIG. 2 illustrates schematically one embodiment of a method for providing a command to the mobile device, In step 210 the mobile device receives an incoming voice call. The incoming voice call may be answered or not be answered as the incoming voice call may comprise a predetermined pattern. The mobile device detects the predetermined pattern in step 220. In one embodiment the predetermined pattern is coded into the duration of the incoming voice calls or into the duration between the incoming voice calls. In step 230 the mobile device detects the predetermined pattern of the previous incoming call attempts. As a response to detecting the predetermined pattern, the mobile device answers the voice call in step 240.

In one embodiment, the user, the calling party is identified via the voice line. The mobile device may detect the user's voice when the user's voice has been previously stored to the memory of the mobile device. Alternatively, or in addition, the user may provide more credentials via the voice line. In one embodiment the mobile device comprises voice control element configured to receive, detect and execute commands received as user's speech. In one embodiment the voice control element is configured to receive and detect DTMF (Dual Tone Multi Frequency) codes that respond to number keys of the calling party's mobile device. In step 250 the mobile device receives a command via the voice line. In one embodiment the mobile device may recognize the identification as a command to execute a default command. One example of the default command is providing text-to-speech output of favorite contacts to the voice line or information of received calls.

Figure 3:
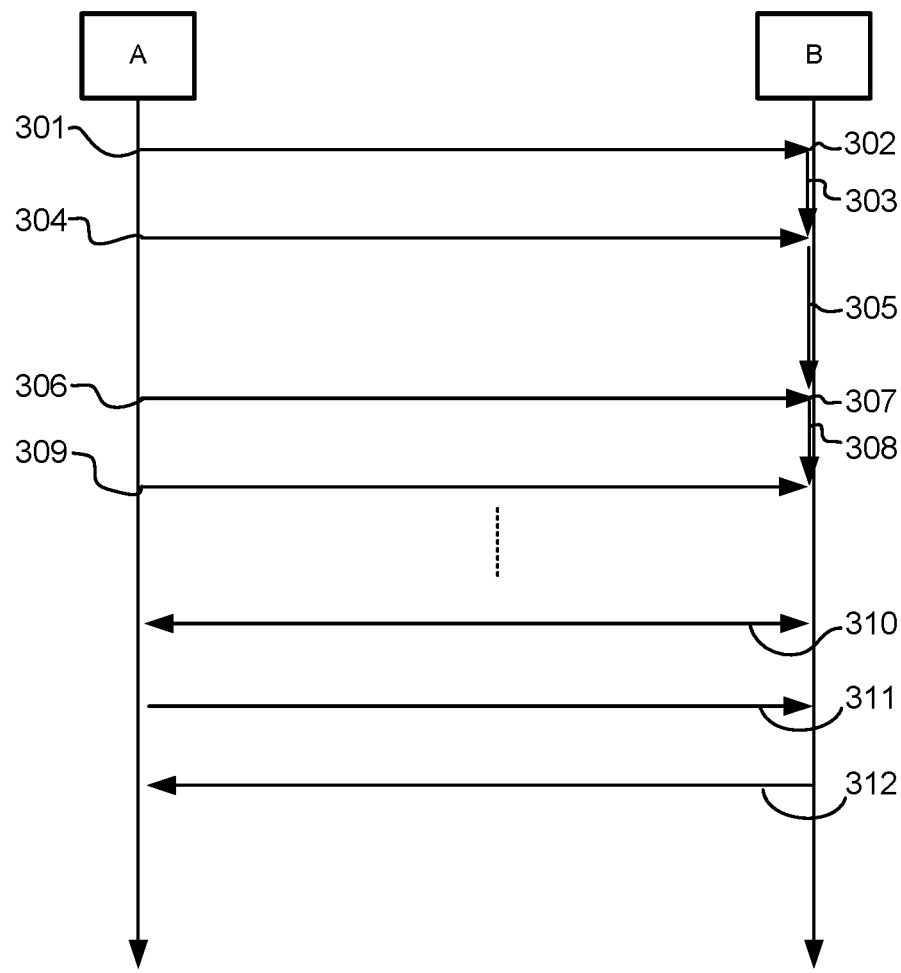
FIG. 3 illustrates schematically a flowchart of one embodiment of the predetermined pattern of signaling.

FIG. 3 illustrates one embodiment of the predetermined pattern. The calling party A initiates a first call 301 to the mobile device B. The mobile device B detects the incoming first call 302, but does not answer the first call 301. The mobile device B detects the duration 303 of the incoming first call 302 and stores the duration 303 after the calling party A has stopped calling 304, for example by terminating the first call 301 by using a disconnect button. The mobile device B compares the duration 303 to a first predetermined duration. If the durations match, fulfilling the first sequence of the predetermined pattern, the mobile device B waits for the next sequence in the predetermined pattern. After the first call 301 has been terminated, the calling party A may wait for a predetermined period 305 before initiating a second call 306. The period 305 between two consecutive incoming calls 302, 307 is in one embodiment a second sequence in the predetermined pattern. The mobile device B detects the second incoming second call 307 and stores the duration 308 of the second incoming call 307. The calling party A terminates 309 the second call 306 after a predetermined period 308. The mobile device B compares the duration 308 to the predetermined period stored to its memory, and if the durations match, detects the period 308 as a third sequence in the predetermined pattern. The user may set the predetermined pattern and store the periods 303, 305, 308 to the memory of the mobile device B.

In one embodiment the predetermined pattern comprises at least three consecutive incoming voice calls, a first incoming voice call having a first predetermined duration and a second incoming voice call having a second predetermined duration. In one embodiment the predetermined pattern comprises multiple consecutive incoming voice calls, and the predetermined pattern is the duration of multiple incoming voice calls. In one embodiment the predetermined pattern comprises multiple consecutive incoming voice calls, and the predetermined pattern comprising the duration between the multiple incoming voice calls.

When the mobile device B has detected the predetermined pattern as a sequence of durations related to consecutive calls, it may require further credentials 310 from the calling party A, if the user has set such requirements to the system. The user may be prompted to dial one-time passwords to avoid leaving any password information on the borrowed phone. The communication with the mobile device's application or operating system may be speech-based as the voice control element may be configured to detect user's speech.

When all the identification steps are completed, the mobile device may respond to any commands 311 from the user via the voice line. In one embodiment the mobile device receives the command 311 causing the mobile device to retrieve an information from a contact book and send the information 312 to the calling party. The voice control element enables complex procedures and commands to be transferred to the operating system or to the application program.

One aspect discloses a method comprising a mobile device connected to a public land mobile network, and; the mobile device receiving an incoming voice call, wherein the incoming voice call comprises a predetermined pattern; detecting the predetermined pattern; answering the voice call in response to detecting the predetermined pattern; identifying a calling party via the voice line; and receiving a command via the voice line. In one embodiment the predetermined pattern comprises at least three consecutive incoming voice calls, a first incoming voice call having a first predetermined duration and a second incoming voice call having a second predetermined duration. In one embodiment the predetermined pattern comprises multiple consecutive incoming voice calls, and the predetermined pattern is the duration of multiple incoming voice calls. In one embodiment the predetermined pattern comprises multiple consecutive incoming voice calls, and the predetermined pattern comprising the duration between the multiple incoming voice calls. In one embodiment identifying the calling party via the voice line comprises detecting a DTMF code. In one embodiment identifying the calling party via the voice line comprises a detecting a predefined user voice. In one embodiment receiving the command causes the mobile device to retrieve an information from a contact book and sending the information to the calling party. In one embodiment receiving the command causes the mobile device to retrieve an information from a contact book and provide text-to-speech presentation of the information over the voice line.

Alternatively, or in addition, one aspect discloses a mobile device connected to a public land mobile network, comprising; at least one processor and a memory storing instructions that, when executed cause the device to: receive an incoming voice call comprising a predetermined pattern; detect the predetermined pattern; answer the voice call in response to detecting the predetermined pattern; identify a calling party via the voice line; receive a command via the voice line. In one embodiment the predetermined pattern comprises at least three consecutive incoming voice calls, a first incoming voice call having a first predetermined duration and a second incoming voice call having a second predetermined duration. In one embodiment the predetermined pattern comprises multiple consecutive incoming voice calls, and the predetermined pattern comprises the duration of multiple incoming voice calls. In one embodiment the predetermined pattern comprises multiple consecutive incoming voice calls, and the predetermined pattern comprises the duration between the multiple incoming voice calls. In one embodiment identification of the calling party via the voice line comprises the mobile device detecting a DTMF code. In one embodiment identification of the calling party via the voice line comprises the mobile device detecting a predefined user voice. In one embodiment reception of the command causes the mobile device to retrieve an information from a contact book and send the information to the calling party. In one embodiment receiving the command causes the mobile device to retrieving an information from a contact book and provide text-to-speech presentation of the information to the voice line.

Alternatively, or in addition, one aspect discloses a mobile device connected to a public land mobile network. The mobile device comprises means for receiving an incoming voice call comprising a predetermined pattern via a voice line; means for detecting the predetermined pattern; means for answering the voice call in response to detecting the predetermined pattern; means for identifying a calling party via the voice line; and means for receiving a command via the voice line. In various examples the means for receiving an incoming voice call, means for detecting the predetermined pattern, means for answering the voice call, means for identifying and means for receiving the command comprise a processor and a memory arranged on the smartphone according to the example of FIG. 1a.

Alternatively, or in addition, one aspect discloses a system comprising: a processing system configured to execute one or more instructions; and one or more computer-readable storage media having the one or more instructions stored thereon that, responsive to execution by the processing system, cause the processing system to: receive an incoming voice call; detect a predetermined pattern in multiple incoming voice calls; answer the voice call in response to detecting the predetermined pattern; identify a calling party via the voice line; and receive a command via the voice line. In one embodiment the predetermined pattern comprises at least three consecutive incoming voice calls and the pattern is coded into the duration of the incoming voice calls or into the duration between the incoming voice calls, wherein the processing system causes the computing device to answer the last incoming call in response to detecting the predetermined pattern. In one embodiment the processing system causes the computing device to detect a DTMF code from the voice line and to identify the calling party. In one embodiment receiving the command causes the processing system to retrieve an information from a contact book and to send the information to the calling party.

Alternatively, or in addition, the functionality described herein can be performed, at least in part, by one or more hardware components or hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs). For example, some or all of the depth camera functionality, 3D imaging functionality or gesture detecting functionality may be performed by one or more hardware logic components.

An embodiment of the apparatus or a system described hereinbefore is a computing-based device comprising one or more processors which may be microprocessors, controllers or any other suitable type of processors for processing computer executable instructions to control the operation of the device in order to control one or more sensors, receive sensor data and use the sensor data. Platform software comprising an operating system or any other suitable platform software may be provided at the computing-based device to enable application software to be executed on the device.

The computer executable instructions may be provided using any computer-readable media that are accessible by a computing based device. Computer-readable media may include, for example, computer storage media such as memory and communications media. Computer storage media, such as a memory, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not embodiments of computer storage media. Although the computer storage media are shown within the computing-based device it will be appreciated that the storage may be distributed or located remotely and accessed via a network or other communication link, for example by using a communication interface.

The computing-based device may comprise an input/output controller arranged to output display information to a display device which may be separate from or integral to the computing-based device. The display information may provide a graphical user interface, for example, to display hand gestures tracked by the device using the sensor input or for other display purposes. The input/output controller may also be arranged to receive and process input from one or more devices, such as a user input device (e.g. a mouse, keyboard, camera, microphone or other sensor). In some embodiments the user input device may detect voice input, user gestures or other user actions and may provide a natural user interface (NUI). This user input may be used to configure the device for a particular user such as by receiving information about bone lengths of the user. In an embodiment the display device may also act as the user input device if it is a touch sensitive display device. The input/output controller may also output data to devices other than the display device, e.g. a locally connected printing device.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Embodiments of tangible storage media include computer storage devices comprising computer-readable media such as disks, thumb drives, memory etc. and do not only include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an embodiment of the process described as software. A local or terminal computer may access the remote computer and download a part or all of the software to run the program. Alternatively, the local computer may download pieces of the software as needed, or execute some software instructions at the local terminal and some at the remote computer (or computer network). Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Although the subject matter has been described in language specific to structural features and/or acts, it is to be understood that the subject matter defined in the appended claims is not necessarily limited to the specific features or acts described above. Rather, the specific features and acts described above are disclosed as embodiments of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, embodiments and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method performed by a mobile device, said method comprising:
   receiving an incoming voice call via a voice line, wherein the incoming voice call comprises a predetermined pattern;
   detecting the predetermined pattern;
   answering the voice call in response to detecting the predetermined pattern;
   identifying a calling party via the voice line; and
   receiving a command via the voice line.

2. A method according to claim 1, wherein the predetermined pattern comprises at least three consecutive incoming voice calls, a first incoming voice call having a first predetermined duration and a second incoming voice call having a second predetermined duration.

3. A method according to claim 1, wherein the predetermined pattern comprises multiple consecutive incoming voice calls, and the predetermined pattern is the duration of multiple incoming voice calls.

4. A method according to claim 1, wherein the predetermined pattern comprises multiple consecutive incoming voice calls, and the predetermined pattern is the duration between the multiple incoming voice calls.

5. A method according to claim 1, wherein identifying the calling party via the voice line comprises detecting a DTMF code.

6. A method according to claim 1, wherein identifying the calling party via the voice line comprises a detecting a predefined user voice.

7. A method according to claim 1, wherein receiving the command causes the mobile device to retrieve an information from a contact book and send the information to the calling party.

8. A method according to claim 1, wherein receiving the command causes the mobile device to retrieve an information from a contact book and provide text-to-speech presentation of the information via the voice line.

9. A mobile device comprising:
   at least one processor and a memory storing instructions that, when executed cause the device to:
   receive an incoming voice call comprising a predetermined pattern via a voice line;
   detect the predetermined pattern;
   answer the voice call in response to detecting the predetermined pattern;
   identify a calling party via the voice line; and
   receive a command via the voice line.

10. A mobile device according to claim 9, wherein the predetermined pattern comprises at least three consecutive incoming voice calls, a first incoming voice call having a first predetermined duration and a second incoming voice call having a second predetermined duration.

11. A mobile device according to claim 9, wherein the predetermined pattern comprises multiple consecutive incoming voice calls, and the predetermined pattern is the duration of multiple incoming voice calls.

12. A mobile device according to claim 9, wherein the predetermined pattern comprises multiple consecutive incoming voice calls, and the predetermined pattern comprising the duration between the multiple incoming voice calls.

13. A mobile device according to claim 9, wherein identification of the calling party via the voice line comprises the mobile device detecting a DTMF code.

14. A mobile device according to claim 9, wherein identification of the calling party via the voice line comprises the mobile device detecting a predefined user voice.

15. A mobile device according to claim 9, wherein reception of the command causes the mobile device to retrieve an information from a contact book and send the information to the calling party.

16. A mobile device according to claim 9, wherein receiving the command causes the mobile device to retrieve an information from a contact book and provide text-to-speech presentation of the information via the voice line.

17. A system comprising:
a processing system configured to execute one or more instructions; and one or more computer-readable storage media having the one or more instructions stored thereon that, responsive to execution by the processing system, cause the processing system to:
receive an incoming voice call via a voice line;
detect a predetermined pattern in multiple incoming voice calls;
answer the voice call in response to detecting the predetermined pattern;
identify a calling party via the voice line; and
receive a command via the voice line.

18. A system according to claim 17, wherein the predetermined pattern comprises at least three consecutive incoming voice calls and the pattern is coded into the duration of the incoming voice calls or into the duration between the incoming voice calls, wherein the processing system causes the computing device to answer the last incoming call in response to detecting the predetermined pattern.

19. A system according to claim 17, wherein the instructions cause the processing system detects a DTMF code from the voice line to identify the calling party.

20. A system according to claim 17, wherein receiving the command causes the processing system to retrieve an information from a contact book and to send the information to the calling party.

* * * * *